US012696854B2

(12) United States Patent
Qian et al.

(10) Patent No.: US 12,696,854 B2
(45) Date of Patent: Aug. 4, 2026

(54) ENERGY IRRIGATION PUMP TRUCK

(71) Applicant: ZHEJIANG UNIVERSITY OF WATER RESOURCES AND ELECTRIC POWER, Hangzhou (CN)

(72) Inventors: Heng Qian, Hangzhou (CN); Chun Xiang, Hangzhou (CN); Zhenhua Duan, Hangzhou (CN); Sanxia Zhang, Hangzhou (CN); Junwei Jiang, Hangzhou (CN); Zhanfeng Tu, Hangzhou (CN); Yunrong Shen, Hangzhou (CN)

(73) Assignee: ZHEJIANG UNIVERSITY OF WATER RESOURCES AND ELECTRIC POWER, Hangzhou (CN)

( * ) Notice: Subject to any disclaimer, the term of this patent is extended or adjusted under 35 U.S.C. 154(b) by 218 days.

(21) Appl. No.: 18/708,297

(22) PCT Filed: Jan. 5, 2024

(86) PCT No.: PCT/CN2024/070817
§ 371 (c)(1),
(2) Date: May 8, 2024

(87) PCT Pub. No.: WO2024/104499
PCT Pub. Date: May 23, 2024

(65) Prior Publication Data
US 2025/0008892 A1     Jan. 9, 2025

(30) Foreign Application Priority Data

Nov. 14, 2022     (CN) ......................... 202211417834.3

(51) Int. Cl.
*A01G 25/09*          (2006.01)
*F04D 9/00*           (2006.01)
(Continued)

(52) U.S. Cl.
CPC ............. *A01G 25/09* (2013.01); *F04D 9/003* (2013.01); *F04D 13/068* (2013.01); *F04D 1/00* (2013.01); *F04D 29/00* (2013.01)

(58) Field of Classification Search
CPC ...... A01G 25/09; F04B 11/00; F04B 11/0008; F04B 23/04; F04D 1/00; F04D 13/068;
(Continued)

(56) References Cited

U.S. PATENT DOCUMENTS 1,855,061 A * 4/1932 Lauchenauer ............ F04D 9/06
                                                           417/80
3,895,885 A * 7/1975 Liberg .................... B63B 27/24
                                                           417/54
(Continued)

FOREIGN PATENT DOCUMENTS

CN          204296791 U  *  4/2015
CN          204560473 U     8/2015
(Continued)

OTHER PUBLICATIONS

International Search Report, PCT/CN2024/070817, Mar. 29, 2024.

*Primary Examiner* — Charles G Freay
*Assistant Examiner* — Joseph S. Herrmann
(74) *Attorney, Agent, or Firm* — Welsh Flaxman & Gitler LLC

(57)          ABSTRACT
A new energy irrigation pump truck is provided, which includes a movable platform arranged on a frame with wheels, a support frame and a water pump assembly arranged on the movable platform, and a charging assembly arranged on a side surface of the support frame. A storage battery is arranged on the movable platform, and the water pump assembly includes a pump body and a motor. The charging assembly includes a solar panel for charging the storage battery, and a support plate. One side of the support plate is provided with the solar panel and the other side of
(Continued)

the support plate is provided with a telescopic rod, and the support plate is able to be unfolded outward relative to the support frame. When the support plate is unfolded, the solar panel faces upward, and the telescopic rod extends vertically and contacts with the ground to support the support plate.

6 Claims, 5 Drawing Sheets

(51) Int. Cl.

| | | |
|---|---|---|
| *F04D 13/06* | (2006.01) | |
| *F04D 1/00* | (2006.01) | |
| *F04D 29/00* | (2006.01) | |

(58) Field of Classification Search
CPC .......... F04D 13/12; F04D 29/00; F04D 9/001; F04D 9/003
See application file for complete search history.

(56) References Cited

U.S. PATENT DOCUMENTS

| | | | | |
|---|---|---|---|---|
| 4,494,465 | A | * | 1/1985 | Fick, Jr. ................. A47B 3/083 |
| | | | | 108/131 |
| 8,453,771 | B1 | * | 6/2013 | Hirschfeld ............. B60L 8/003 |
| | | | | 180/19.1 |
| 2023/0320294 | A1 | * | 10/2023 | Renaux ................... H04W 4/38 |

FOREIGN PATENT DOCUMENTS

| | | | | | |
|---|---|---|---|---|---|
| CN | 104969836 | A | * | 10/2015 | ............. A01G 25/09 |
| CN | 107173180 | A | | 9/2017 | |
| CN | 209212484 | U | | 8/2019 | |
| CN | 210431324 | U | * | 4/2020 | |
| CN | 212034981 | U | * | 12/2020 | |
| CN | 213199977 | U | | 5/2021 | |
| CN | 112931471 | A | | 6/2021 | |
| CN | 114696731 | A | | 7/2022 | |
| CN | 217496542 | U | * | 9/2022 | |
| CN | 115223319 | A | | 10/2022 | |
| CN | 115735732 | A | | 3/2023 | |

* cited by examiner

ENERGY IRRIGATION PUMP TRUCK

CROSS REFERENCE TO RELATED APPLICATION

This application is a national stage application of International Patent Application No. PCT/CN2024/070817 filed on Jan. 5, 2024, which claims the priority of Chinese Patent Application No. 202211417834.3 entitled "NEW ENERGY IRRIGATION PUMP TRUCK" filed with the Chinese Patent Office on Nov. 14, 2022, which is incorporated herein by reference in its entirety.

TECHNICAL FIELD

The present disclosure belongs to the field of irrigation equipment, in particular to a new energy irrigation pump truck.

BACKGROUND

In view of the existing irrigation modes, the way of building a pump house is usually used to irrigate crops in jurisdictional areas. However, the construction process of the pump house involves many aspects, such as land approval, construction, electricity utilization, network and personnel management, and the complicated approval procedures, long construction period, high site requirements and high difficulty in management may lead to the high construction cost of the pump house. In addition, the pump house can only irrigate the area within the design scope, is high in energy consumption, and cannot be flexibly dispatched according to the needs of drought, such that the application range is narrow and there are many inconveniences in use.

SUMMARY

Aiming at the problems of the existing pump house, such as the high construction cost and limited application scope, the present disclosure provides a new energy irrigation pump truck, which adopts a movable structure to expand its usage scenarios, can cope with various unexpected situations, can also collect electric energy by using solar panels and store the electric energy in a storage battery. The storage battery supplies power to a water pump assembly, which is convenient for power supply without causing serious pollution.

The technical solution adopted by the present disclosure is as follows. A new energy irrigation pump truck includes:

a movable platform arranged on a frame with wheels, wherein a storage battery is arranged on the movable platform;

a support frame arranged on the movable platform to form a support area that is rectangular;

a water pump assembly arranged on the movable platform and located in the support area, comprising a pump body and a motor for driving the pump body to work;

at least one charging assembly arranged on a side surface of the support frame, where the at least one charging assembly comprises a solar panel for charging the storage battery and a support plate, the support plate is connected with a top of the support frame through hinges and is able to be unfolded outwards relative to the support frame, one side of the support plate is provided with the solar panel, and an other side of the support plate is provided with a telescopic rod; and when the support plate is unfolded, the solar panel faces upward, and the telescopic rod vertically extends and contacts with ground to support the support plate.

The pump truck is integrated with the functions of an original pump house, and moves through the frame. The pump truck is convenient to use, the requirements on the site are reduced, the tedious approval process and lengthy construction cycle are omitted, and the production cost is effectively reduced. As a support skeleton, the support frame can provide enough support and better protect for the water pump assembly. The pump body is connected with a water source, and the motor provides irrigation power. At least one charging assembly is arranged on the side surface of the support frame, and can be unfolded to charge through the solar panel when the movable platform is stationary (both in a working state and a non-working state). Compared with a solar panel arranged on the top of the support frame, the charging assembly in the embodiments has a larger working surface, is relatively stable in structure, does not generate smoke or noise during working, and can provide a better working environment. The storage battery is located on the movable platform and at the bottom of the whole pump truck, and supplies power to the pump assembly, such that the center of gravity of the whole pump truck can be lowered, the storage battery can also be protected to prevent spontaneous combustion caused by direct sunlight. The power supply does not depend on the power grid equipment and is very convenient.

The embodiments further aim to effectively protect the water pump assembly through a separated arrangement of the charging assembly for solar charging and the structure for protecting the water pump assembly. The specific solution is as follows. The side surface of the support frame may be further provided with a protective plate, the protective plate may be hinged onto the support frame, a hinge position of the support plate and the support frame may be higher than a hinge position of the protective plate and the support frame, and the support plate may be able to cover the protective plate when the support plate may be in a vertical state. Both the support plate and the protective plate can rotate and be unfolded from bottom to top, and the protective plate and the charging assembly are independent of each other. When the charging assembly is started to work, the protective plate can be folded for dust protection or unfolded for heat dissipation according to needs, and is flexible and convenient to use.

Further, a split plate may be hinged to a lower portion of the support frame. The split plate may be able to be in a lapped connection with the protective plate. A notch may be formed in the protective plate. A top of the split plate and the notch may enclose an avoidance opening. The pump body may include a water outlet and a water inlet, and the water outlet and the water inlet may be able to extend out of the avoidance opening. The split plate can prevent rats from jumping on the movable platform to gnaw cables and power connection cables to damage the pump truck when the support plate is unfolded. When the protective plate is folded upwards and unfolded, the limit of the split plate is released, and the protective plate is convenient to use.

Further, the support plate is at least one of the following two structures.

The support plate may be a foldable plate. The foldable plate may include a first combined plate and a second combined plate. A side of the first combined plate and a side of the second combined plate may be hinged to each other, and the first combined plate may be connected with the support frame. When the first combined plate and the second combined plate may be oppositely arranged, the foldable plate may be in a folded state. When the first combined plate and the second combined plate may be relatively away from each other, the foldable plate may be in an unfolded state. When the first combined plate and the second combined plate may be in the folded state, the solar panel may be arranged on a surface of the first combined plate which may be opposite to the second combined plate, and the telescopic rod may be arranged on an outer side surface of the second combined plate. The first combined plate and the second combined plate can be limited with each other by buckle latches or buckles, such that the foldable plate is prevented from being accidentally unfolded when the pump truck moves. The side of the first combined plate and the side of the second combined plate are hinged to each other to form a foldable structure, such that the area of the solar panel is increased, so as to improve the charging efficiency of the solar panel. In the folded state, the solar panel is accommodated between the first combined panel and the second combined panel, such that that the solar panel can be effectively protected from accidental scratches and scratches, and pollution can also be prevented. The telescopic rod is located on the outer side surface of the second combined plate to facilitate observation, such that the telescopic rod is prevented from failing due to jamming.

The support plate may be a planar plate. A side of the planar plate may be hinged to the support frame. The solar panel may be arranged on a first side surface of the planar plate which is away from the support frame, and the telescopic rod may be arranged on a second side surface of the planar plate which is adjacent to the support frame. The solar panel is located on the outer side, and energy can be stored by illumination even if the support plate is not fully unfolded, such that the charging efficiency is ensured.

The embodiments aim to provide an irrigation pump house capable of charging an unmanned aerial vehicle. The specific solution is as follows. A concave cavity may be formed in the top of the support frame. A carrying assembly for an unmanned aerial vehicle to stop and charge may be arranged at the concave cavity. The carrying assembly may include a lifting frame and a parking apron. The lifting frame may include two lifting assemblies connected to each other through a connecting rod. The connecting rod may be driven by a telescopic motor, and when the telescopic motor may extend or retract, the lifting frame may rise or fall. The parking apron may be equipped with a contact charging module, and the contact charging module may charge when the lifting frame may rise to a position where the parking apron may contact with the unmanned aerial vehicle.

Further, a water storage tank is further formed in the top of the support frame, the water storage tank and the concave cavity are arranged side by side.

Further, the water pump assembly may further include a gas-water separation tank and a vacuum pump which may be arranged on the movable platform. The vacuum pump may be connected with the gas-water separation tank through a first connecting pipe, and the gas-water separation tank may be connected with the pump body through a second connecting pipe. The vacuum pump can pump out gas in the pump body through the first connecting pipe and the second connecting pipe to ensure the suction distance of the water pump.

Further, the movable platform may be further provided with a control cabinet. The control cabinet may be internally provided with a frequency conversion control device, a solar inverter, an energy storage battery power supply management module and a remote communication system. The frequency conversion control device may be configured for controlling the rotating speed of the motor and monitoring an operating state of the motor. The solar inverter may be configured for rectifying current generated by the solar panel and storing current in the storage battery. The storage battery power supply management module may be configured for managing charging and discharging of the storage battery and monitoring a state of the storage battery. The remote communication system may be configured for receiving and sending out remote control signals. On one hand, the control signals sent by the manager through the remote management platform can be received to realize the functions such as remotely starting the motor. On the other hand, the parameters such as power consumption, remaining power, used power and rotating speed of the pump truck can be sent to the remote management platform for the manger to manage. In addition, the pump truck can be associated with management platforms such as smart farms so as to preferably carry out macro scheduling. In order to enhance the distance of remote control, the top of the pump truck is equipped with an antenna to enhance communication signals.

Further, the wheels may be arranged at a bottom of the frame. The wheels may include front wheels and rear wheels. The front wheels may include two front wheels. Each of the two front wheels may be provided with a hub motor, and steering may be realized by controlling the two front wheels to rotate at different rotating speeds; and the rear wheels comprise two rear wheels, and the two rear wheels are connected with each other through a transmission shaft. The transmission shaft is driven by a driving motor, and the driving motor is connected with the storage battery.

The embodiments have the following beneficial effects. The new energy irrigation pump truck is provided. The pump truck moves through the frame. The pump truck is convenient to use, the requirements on the site are reduced, and the production cost is effectively reduced. The support frame can provide enough support and better protect for the water pump assembly. The pump body is connected with a water source, and the motor provides irrigation power. At least one charging assembly is arranged on the side surface of the support frame, and can be unfolded to charge through the solar panel when the movable platform is stationary. Compared with a solar panel arranged on the top of the support frame, the charging assembly has a larger working surface, does not generate smoke or noise during working, and can provide a better working environment. The storage battery is located on the movable platform and at the bottom of the whole pump truck, and supplies power to the pump assembly, such that the center of gravity of the whole pump truck can be lowered, the storage battery can also be protected to prevent spontaneous combustion caused by direct sunlight. The power supply does not depend on power grid equipment and is very convenient. In addition, the protective plate and the charging assembly are independent of each other. When the charging assembly is started to work, the protective plate can be folded for dust protection or unfolded for heat dissipation according to needs, and is flexible and convenient to use.

LIST OF THE REFERENCE CHARACTERS

Figure 1:
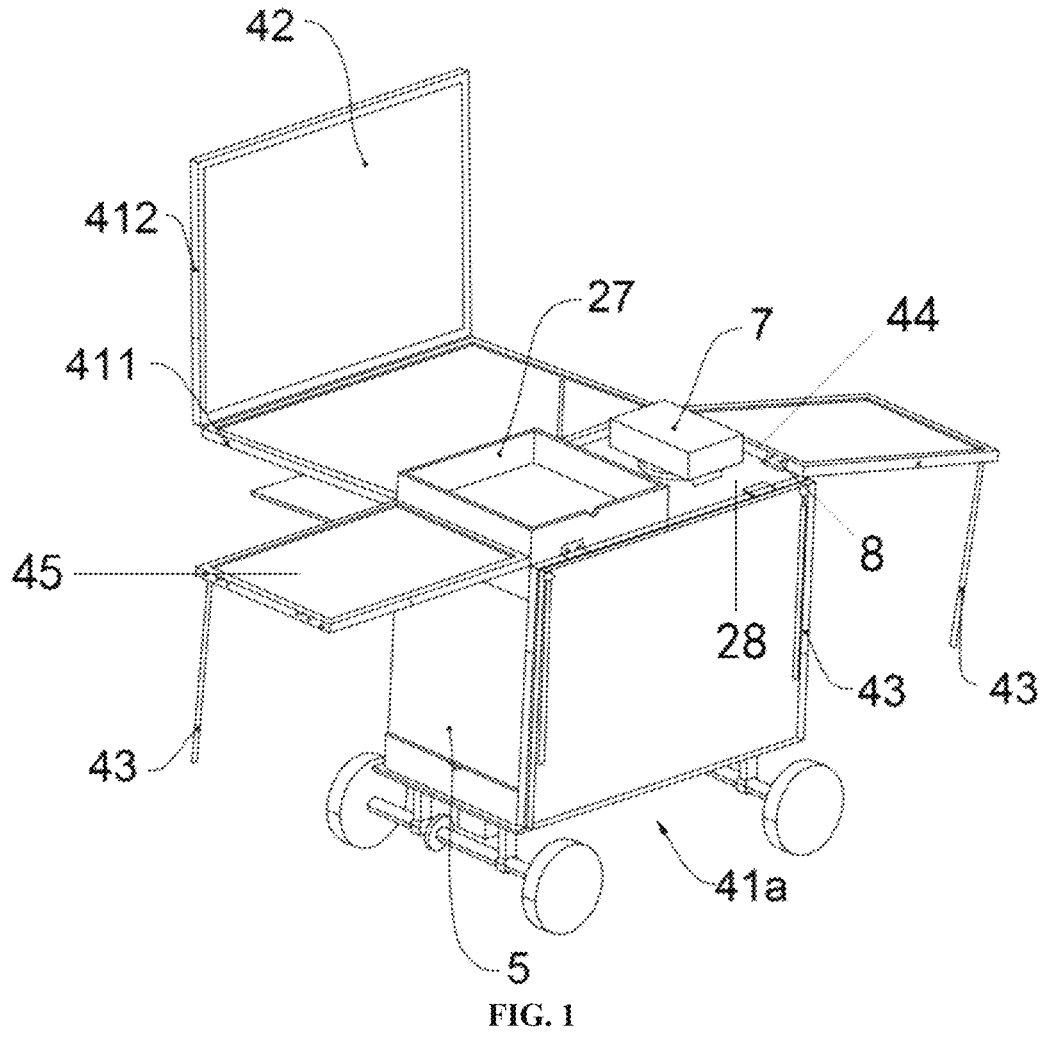
FIG. 1 is a structural schematic diagram of a new energy irrigation pump truck.
Figure 2:
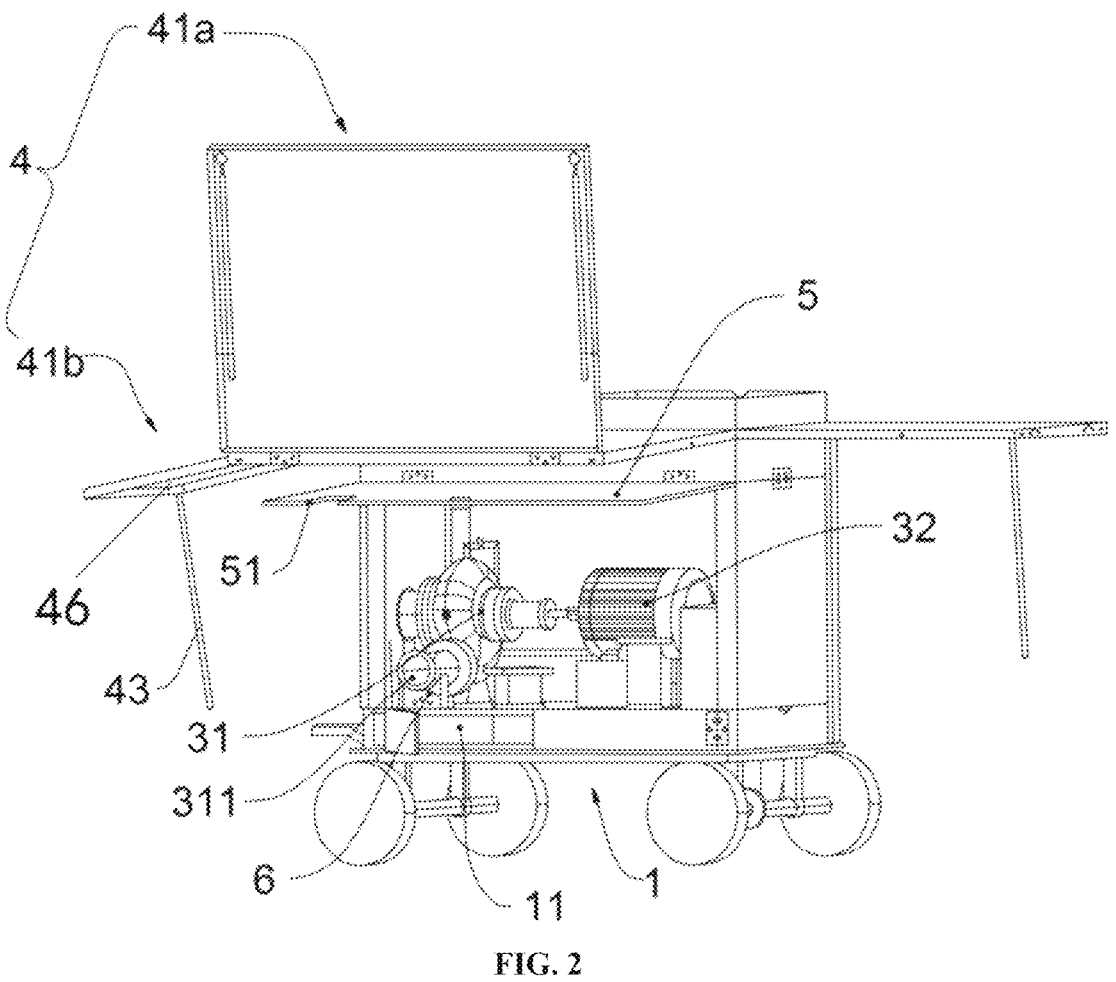
FIG. 2 is an internal structural schematic diagram of the new energy irrigation pump truck.
Figure 3:
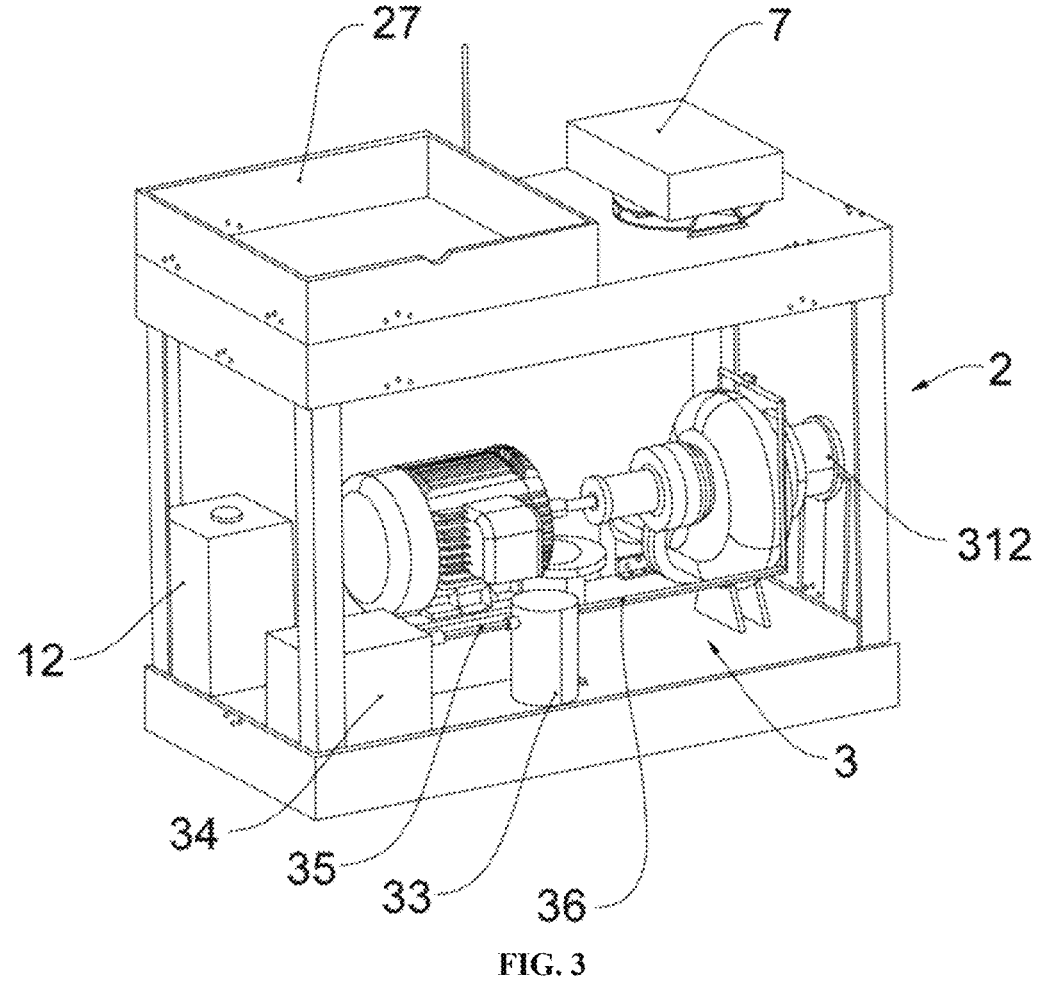
FIG. 3 is a structural schematic diagram of a support frame.

1 movable platform;
11 storage battery;
12 control cabinet;
2 support frame;
21 concave cavity;
22 lifting frame;
23 parking apron;
24 lifting assembly;
241 first support rod;
242 second support rod;
25 connecting rod;
26 telescopic motor;
27 water storage tank;
28 top of the support frame;
3 water pump assembly;
31 pump body;
311 water outlet;
312 water inlet;
32 motor;
33 gas-water separation tank;
34 vacuum pump;
35 first connecting pipe;
36 second connecting pipe;
4 charging assembly;
41a foldable plate;
41b planar plate;
411 first combined plate;
412 second combined plate;
42 solar panel;
43 telescopic rod;
44 side of the planar plate;
45 first side surface;
46 second side surface;
5 protective plate;
51 notch;
6 split plate;
7 unmanned aerial vehicle; and
8 hinge.

DETAILED DESCRIPTION OF THE EMBODIMENTS

The following explains and describes the technical solutions in the embodiments of the present invention with reference to the drawings in the embodiments of the present disclosure, but the following embodiments are just preferred embodiments of the present disclosure, not all embodiments of the present disclosure. Other embodiments obtained by those skilled in the art based on the embodiments of the present disclosure without creative efforts shall fall within the protection scope of the present disclosure.

A new energy irrigation pump truck in the embodiment, as shown in FIG. 1 to FIG. 5, includes:

a movable platform 1 arranged on a frame with wheels, where a storage battery 11 is arranged on the movable platform 1, and a lead-acid storage battery with stable performance is adopted in the present disclosure;

a support frame 2 arranged on the movable platform 1 to form a rectangular support area;

a water pump assembly 3 arranged on the movable platform 1 and located in the support area, including a pump body 31 and a motor 32 for driving the pump body 31 to work;

a charging assembly 4 arranged on a side surface of the support frame 2, where the number of the charging assembly 4 is four, the charging assembly 4 includes a solar panel 42 for charging the storage battery 11, and a support plate, one side of the support plate is provided with the solar panel 42, the other side of the support plate is provided with a telescopic rod 43, and the support plate is connected with the top 28 of the support frame 2 through hinges 8 and is able to be unfolded outwards relative to the support frame 2; and when the support plate is unfolded, the solar panel 42 faces upward, and the telescopic rod 43 vertically extends and contacts with the ground to support the support plate.

The support plate is a foldable plate 41a. The foldable plate 41a includes a first combined plate 411 and a second combined plate 412, and the sides of the first combined plate 411 and the side of the second combined plate 412 are hinged to each other. The first combined plate 411 is connected with the support frame 2. When the first combined plate 411 and the second combined plate 422 are oppositely arranged, the foldable plate 41a is in a folded state. When the first combined plate 411 and the second combined plate 412 are relatively away from each other, the foldable plate 41a is in an unfolded state. When the first combined plate 411 and the second combined plate 412 are in the folded state, the solar panel 42 is arranged on the surface, which is opposite to the second combined plate 412, of the first combined plate 411, and the telescopic rod 43 is arranged on an outer side surface of the second combined plate 412. The first combined plate 411 and the second combined plate 412 can be limited with each other by buckle latches or buckles, such that the foldable plate 41a is prevented from being accidentally unfolded when the pump truck moves. The side of the first combined plate 411 and the side of the second combined plate 412 are hinged to each other to form a foldable structure, such that the area of the solar panel 42 is increased, and the charging efficiency of the solar panel 42 is improved. In the folded state, the solar panel 42 is accommodated between the first combined panel 411 and the second combined panel 412, such that the solar panel 42 can be effectively protected from accidental scratches and scratches, and pollution can also be prevented. The telescopic rod 43 is located on the outer side surface of the second combined plate 412 to facilitate observation, such that the telescopic rod 43 is prevented from failing due to jamming.

The support plate is a planar plate 41b. The side 44 of the planar plate 41b is hinged to the support frame 2. The solar panel 42 is arranged on a first side surface 45 of the planar plate 41b, and the telescopic rod 43 is arranged on a second side surface 46 of the planar plate 41b. The solar panel 42 is located on the outer side, and energy can be stored by illumination even if the support plate is not fully unfolded, such that the charging efficiency is ensured.

The telescopic rod 43 can be driven to telescope by a miniature motor or manually controlled to telescope. The telescopic rod 43 is fixed on the support plate by a buckle to be prevented from shaking at will under the influence of jolting when the pump truck runs.

In order to ensure the charging efficiency, the charging assemblies 4 can be arranged on the front, back, left and right side surfaces of the support frame 2. In the embodiment, the support plates arranged on the front and back side surfaces (namely, the two side surfaces vertical to the traveling direction) are planar plates 41b, and the support plates arranged on the left and right side surfaces (namely, the two side surfaces parallel to the traveling direction) are foldable plates 41a. This arrangement can ensure the charging efficiency, and can also ensure that the overall structure is stable and reasonable, without interference with other structures, and the center of gravity is stable. In severe weathers (such as strong wind, typhoon and rainstorm), the telescopic rod retracts, the support plate is placed on the side surface of the support frame, and the pump truck moves to a safe place to ensure the safety of the pump truck.

Another object of the embodiment is to effectively protect the water pump assembly 3 through the separated arrangement of the charging assembly 4 for solar charging and the structure for protecting the water pump assembly 3. The specific solution is as follows. The side surface of the support frame 2 is further provided with a protective plate 5. The protective plate 5 is hinged on the support frame 2. The hinge position of the support plate and the support frame 2 is higher than that of the protective plate 5 and the support frame 2, and the support plate can cover the protective plate 5. Both the support plate and the protective plate 5 can rotate and be unfolded from bottom to top, and the protective plate 5 and the charging assembly 4 are independent of each other. When the charging assembly 4 is started to work, the protective plate 5 can be folded for dust protection or unfolded for heat dissipation according to needs, and is flexible and convenient to use.

A lower portion of the support frame 2 is hinged to a split plate 6. The split plate 6 can be in a lapped connection with the protective plate 5. A notch 51 is formed in the protective plate 5. The top of the split plate 6 and the notch 51 enclose an avoidance opening. A water outlet 311 and a water inlet 312 are formed in the pump body 31. The water outlet 311 and the water inlet 312 can extend out of the avoidance opening. The split plate 6 can prevent rats from jumping on the movable platform 1 to gnaw cables and power connection cables to damage the pump truck when the support plate is unfolded. When the protective plate 5 is folded upwards and folded, the limit of the split plate 6 is released, and the protective plate 5 is convenient to use.

Figure 4:
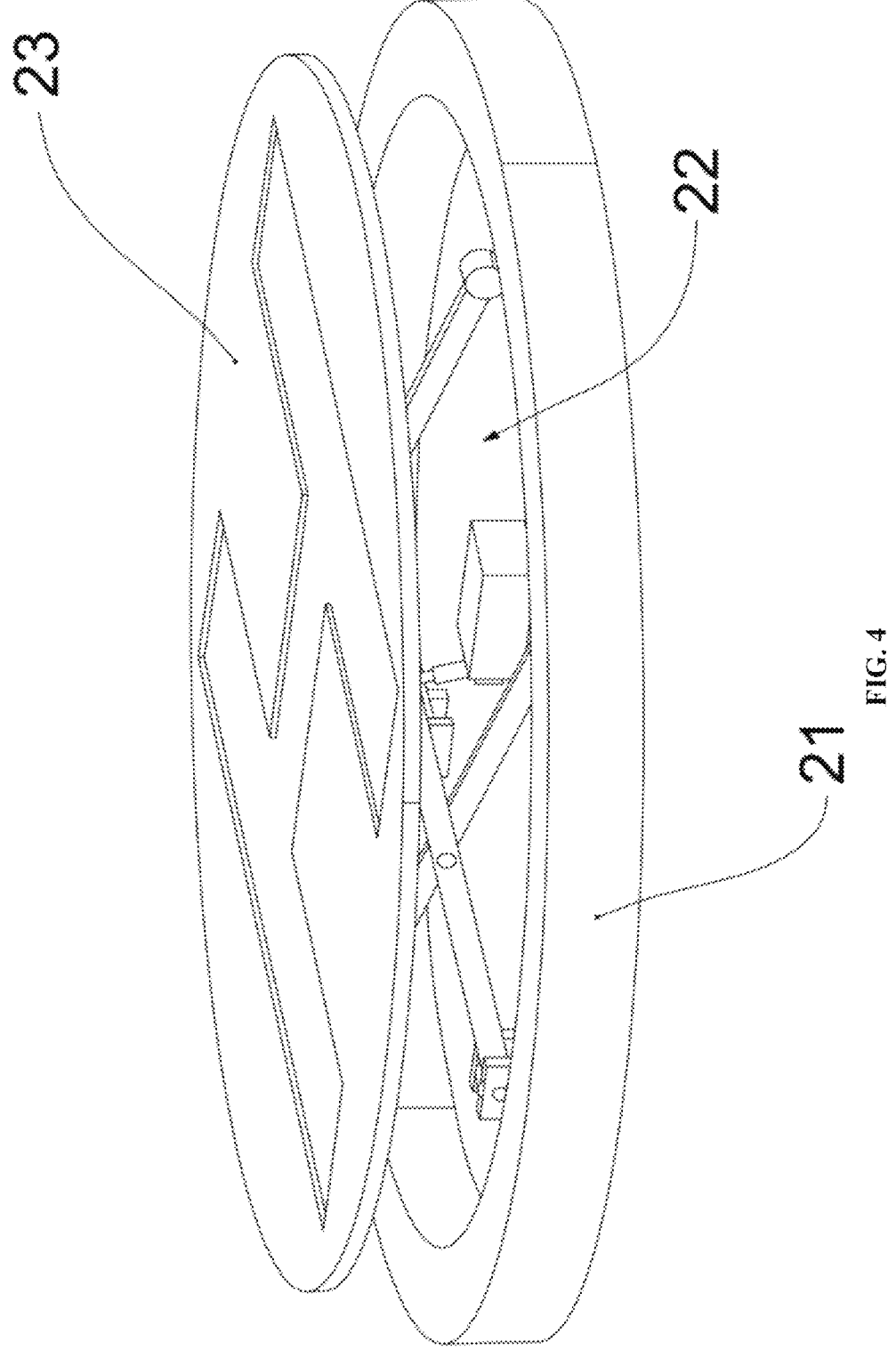
FIG. 4 is a structural schematic diagram of a carrying assembly when being arranged in a concave cavity.
Figure 5:
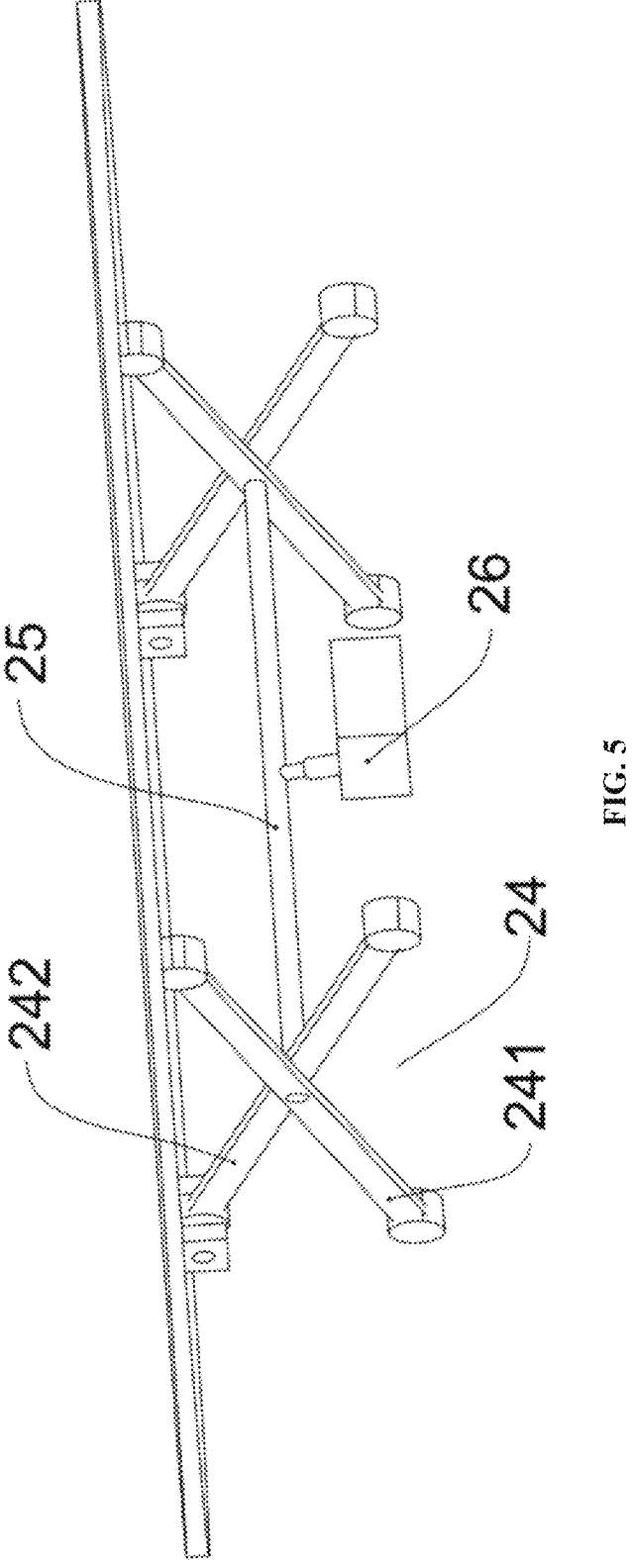
FIG. 5 is a structural schematic diagram of the carrying assembly.

As shown in FIG. 4 and FIG. 5, another object of the embodiment is to provide an irrigation pump truck capable of charging an unmanned aerial vehicle. The specific solution is as follows. A concave cavity 21 is formed in the top of the support frame 2. A carrying assembly for an unmanned aerial vehicle 7 to stop and charge is arranged at the concave cavity 21. The carrying assembly includes a lifting frame 22 and a parking apron 23. The lifting frame 22 includes two lifting assemblies 24 connected to each other through a connecting rod. The connecting rod is driven by a telescopic motor 26. When a working end of the telescopic motor 26 extends or retracts, the lifting frame 22 rises or falls. The parking apron 23 is equipped with a contact charging module, and the contact charging module charges when the lifting frame 22 rises to a position where the parking apron 23 contacts with the unmanned aerial vehicle 7. In the embodiment, the lifting assembly 24 includes a first support rod 241 and a second support rod 242 which are hinged to each other. Both ends of the connecting rod 25 are respectively connected at the hinge positions of the two first support rods 241 and the two second support rods 242. The top of the first support rod 241 is fixed at the bottom of the parking apron 23, and the bottom of the first support rod 241 is hinged in the concave cavity 21. The top of the second support rod 242 is fixed at the bottom of the parking apron 23, and the bottom of the second support rod 242 is slidably connected in the concave cavity 21 through a pulley. When the telescopic motor 26 extends or retracts, the connecting rod 25 drives the hinge position of the first support rod 241 and the second support rod 242 to rise and fall, and the first support rod 241 and the second support rod 242 are driven to rise and fall to realize rising and falling of the lifting frame 22.

A water storage tank 27 is further formed in the top of the support frame 2 for water storage and cooling, and the water storage tank 27 and the concave cavity 21 are arranged side by side. The water storage tank 27 and the concave cavity 21 are independent of each other and do not interfere with each other. The water storage tank 27 is made of insulating materials, and the bottom of the water storage tank 27 is provided with a waterproof coating to realize electrical isolation so as to avoid the risks of electric shock and electric leakage.

The water pump assembly 3 further includes a gas-water separation tank 33 and a vacuum pump 34 which are arranged on the movable platform 1. The vacuum pump 34 is connected with the gas-water separation tank 33 through a first connecting pipe 35. The gas-water separation tank 33 is connected with the pump body 31 through a second connecting pipe 36. Through the first connecting pipe 35 and the second connecting pipe 36, the vacuum pump 34 can pump out gas in the pump body 31 to ensure the suction distance of the water pump.

The movable platform 1 is further provided with a control cabinet 12. The control cabinet 3 is internally provided with a frequency conversion control device, a solar inverter, an energy storage battery power supply management module and a remote communication system. The frequency conversion control device is configured for controlling the rotating speed of the motor 32 and monitoring the operating state of the motor 32, and the operation of the water pump assembly 3 is controlled and monitored. The solar inverter is configured for rectifying current generated by the solar panel 42 and storing the current in the storage battery 11. The storage battery power supply management module is configured for managing the charging and discharging of the storage battery 11 and monitoring the state of the storage battery 11 at the same time. The remote communication system is configured for receiving and sending out remote control signals. On one hand, the control signals sent by the manager can be received through the remote management platform to realize the function of turning on the motor 32 remotely. On the other hand, the parameters such as power consumption, remaining power, used power and rotating speed of the pump truck can be sent to the remote management platform to be managed by the manger. In addition, the pump truck can be associated with management platforms such as smart farms so as to preferably carry out macro scheduling. In order to enhance the distance of remote control, the top of the pump truck is equipped with an antenna to enhance communication signals.

The wheels are arranged at the bottom of the frame. The wheels include front wheels and rear wheels. The number of the front wheels is two. The front wheel is provided with a hub motor, and steering is realized by controlling the two front wheels to rotate at different rotating speeds. The number of the rear wheels is two, and the two rear wheels are connected with each other through a transmission shaft. When driving force acts on the rear wheels, the transmission shaft is driven by a driving motor, and the driving motor supplies power through the storage battery 11.

The above mentioned are only preferred specific embodiments of the present disclosure. However, the scope of protection of the present disclosure is not limited to the embodiments described herein. Those skilled in the art should understand that the present disclosure includes, but is not limited to, the drawings and the above detailed description in the specific embodiments. Any modification that does not deviate from the functional and structural principles of the present disclosure will be included in the scope of the claims.

What is claimed is:

1. A new energy irrigation pump truck, comprising:

a movable platform arranged on a frame with wheels, wherein a storage battery is arranged on the movable platform;

a support frame arranged on the movable platform to form a support area that is rectangular;

a water pump assembly arranged on the movable platform and located in the support area, comprising a pump body and a motor for driving the pump body to work;

at least one charging assembly arranged on a side surface of the support frame, wherein the at least one charging assembly comprises a solar panel for charging the storage battery and a support plate, the support plate is connected with a top of the support frame through hinges and is able to be unfolded outwards relative to the support frame, one side of the support plate is provided with the solar panel, and an other side of the support plate is provided with a telescopic rod; and when the support plate is unfolded, the solar panel faces upward, and the telescopic rod vertically extends and contacts with ground to support the support plate;

wherein a concave cavity is formed in the top of the support frame, a carrying assembly for an unmanned aerial vehicle to stop and charge is arranged at the concave cavity, the carrying assembly comprises a lifting frame and a parking apron; the lifting frame comprises two lifting assemblies connected to each other through a connecting rod, the connecting rod is driven by a telescopic motor, and when the telescopic motor extends or retracts, the lifting frame rises or falls; the parking apron is equipped with a contact charging module, and the contact charging module charges when the lifting frame rises to a position where the parking apron contacts with the unmanned aerial vehicle.

2. The new energy irrigation pump truck according to claim 1, wherein the side surface of the support frame is further provided with a protective plate, the protective plate is hinged onto the support frame, a hinge position of the support plate and the support frame is higher than a hinge position of the protective plate and the support frame, and the support plate is able to cover the protective plate when the support plate is in a vertical state.

3. The new energy irrigation pump truck according to claim 1, wherein the support plate is a foldable plate, the foldable plate comprises a first combined plate and a second combined plate, a side of the first combined plate and a side of the second combined plate are hinged to each other, and the first combined plate is connected with the support frame; when the first combined plate and the second combined plate are oppositely arranged, the foldable plate is in a folded state; when the first combined plate and the second combined plate are relatively away from each other, the foldable plate is in an unfolded state; when the first combined plate and the second combined plate are in the folded state, the solar panel is arranged on a surface of the combined first plate, which is opposite to the second combined plate, and the telescopic rod is arranged on an outer side surface of the second combined plate.

4. The new energy irrigation pump truck according to claim 1, wherein the support plate is a planar plate, a side of the planar plate is hinged to the support frame, the solar panel is arranged on a first side surface of the planar plate which is away from the support frame, and the telescopic rod is arranged on a second side surface of the planar plate.

5. The new energy irrigation pump truck according to claim 1, wherein a water storage tank is further formed in the top of the support frame, the water storage tank and the concave cavity are arranged side by side.

6. The new energy irrigation pump truck according to claim 1, wherein the water pump assembly further comprises a gas-water separation tank and a vacuum pump which are arranged on the movable platform, the vacuum pump is connected with the gas-water separation tank through a first connecting pipe, and the gas-water separation tank is connected with the pump body through a second connecting pipe.

* * * * *